(12) United States Patent
Kim et al.

(10) Patent No.: US 12,552,239 B2
(45) Date of Patent: Feb. 17, 2026

(54) POWER TRANSMISSION DEVICE FOR HYBRID VEHICLE

(71) Applicant: Hyundai Transys Inc., Seosan-si (KR)

(72) Inventors: Seung Hyun Kim, Hwaseong-si (KR); Bon Kyung Koo, Hwaseong-si (KR); Hyun Kyu Kim, Hwaseong-si (KR); Yeon Tae Lee, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 0 days.

(21) Appl. No.: 18/937,568

(22) Filed: Nov. 5, 2024

(65) Prior Publication Data

US 2025/0303845 A1 Oct. 2, 2025

(30) Foreign Application Priority Data

Mar. 26, 2024 (KR) .......................... 10-2024-0040826

(51) Int. Cl.
*B60K 6/365* (2007.10)
*B60K 6/442* (2007.10)
*B60K 6/547* (2007.10)
*F16H 37/08* (2006.01)

(52) U.S. Cl.
CPC ............. *B60K 6/365* (2013.01); *B60K 6/442* (2013.01); *B60K 6/547* (2013.01); *F16H 37/0806* (2013.01); *B60Y 2200/92* (2013.01); *F16H 2200/0039* (2013.01)

(58) Field of Classification Search
CPC ........ B60K 6/442; B60K 6/547; B60K 6/365; B60K 1/02; F16H 3/091–093; F16H 37/0806; F16H 2200/0039
See application file for complete search history.

(56) References Cited

U.S. PATENT DOCUMENTS

| 2017/0203646 | A1* | 7/2017 | Mueller | B60W 10/111 |
| 2022/0136589 | A1* | 5/2022 | Beck | B60K 6/387 |
| | | | | 74/325 |
| 2022/0355657 | A1* | 11/2022 | Kawamoto | B60K 6/40 |
| 2023/0009105 | A1* | 1/2023 | Kwon | B60K 6/48 |

FOREIGN PATENT DOCUMENTS

KR 1020090020791 A 2/2009

* cited by examiner

*Primary Examiner* — Ernesto A Suarez
*Assistant Examiner* — Lillian T Nguyen
(74) *Attorney, Agent, or Firm* — SALIWANCHIK, LLOYD & EISENSCHENK

(57) ABSTRACT

Provided is a power transmission device for a hybrid vehicle including an engine configured to generate power, an input connected with the engine and configured to provide three-speed power with different gear ratios, a first motor generator driven when power is applied, a first transmission connected with the first motor generator, positioned parallel to the input, and configured to transmit power to the input, an output optionally engaged with the input, a second motor generator driven when power is applied, a second transmission connected with the second motor generator, positioned parallel to the output, and configured to transmit power to the output, and a differential engaged with the output and configured to provide power to wheels.

3 Claims, 18 Drawing Sheets

POWER TRANSMISSION DEVICE FOR HYBRID VEHICLE

CROSS-REFERENCE TO RELATED APPLICATION

This application claims the benefit of Korean Patent Application No. 10-2024-0040826, filed Mar. 26, 2024, the disclosure of which is incorporated by reference herein in its entirety.

BACKGROUND

Field

Exemplary embodiments of the present disclosure relate to a power transmission device for a hybrid vehicle, and more particularly, to a power transmission device for a hybrid vehicle capable of removing a clutch connecting an engine power, securing space for a first motor and a second motor, and reducing an overall length.

Discussion of the Background

In general, a power transmission device for a hybrid vehicle has a layout in which a motor, an engine, and an integrated starter-generator (ISG) are arranged in a line.

In a hybrid vehicle utilizing the engine and the motor, the motor is used to facilitate the initial start of the vehicle. Once the vehicle reaches a certain speed, the generator, or ISG, starts the engine so that both the output of the engine and the output of the motor are used.

The motor used in the power transmission device for a hybrid vehicle may be driven to enable electric driving of the vehicle when the engine is not initially running.

Recently, the number of motors is not limited to one. Instead, two or more motors are positioned in multiples. For example, when two motors are positioned in the power transmission device for a hybrid vehicle, a first motor may be driven to start the engine, and a second motor may be driven for electric driving of the vehicle.

However, in the related art, the motor needs to be large to deliver the required torque for the vehicle, making it difficult to design the layout. When a friction clutch is provided on a power shaft connecting the engine and the transmission, there is an issue of increased product length and self-load due to the large size of the friction clutch. In addition, when a dog clutch is provided on the power shaft connecting the engine and the transmission, the motor needs to be concentrically positioned with the engine, which is a limitation in terms of an overall length. Therefore, it is necessary to address this issue.

The background technology of the present disclosure is disclosed in Korean Patent Application Publication No. 2009-0020791 (published on Feb. 27, 2009 and entitled "POWER TRANSMISSION DEVICE FOR HEV").

SUMMARY

Various embodiments are directed to a power transmission device for a hybrid vehicle capable of removing a clutch connecting an engine power, securing space for a first motor and a second motor, and reducing an overall length.

In an embodiment, a power transmission device for a hybrid vehicle includes: an engine configured to generate power; an input connected with the engine and configured to provide three-speed power with different gear ratios; a first motor generator driven when power is applied; a first transmission connected with the first motor generator, positioned parallel to the input, and configured to transmit power to the input; an output optionally engaged with the input; a second motor generator driven when power is applied; a second transmission connected with the second motor generator, positioned parallel to the output, and configured to transmit power to the output; and a differential engaged with the output and configured to provide power to wheels.

The input may include an input shaft connected with the engine, a constant input gear constantly connected with the input shaft and engaged with the first transmission, and an optional input gear optionally connected with the input shaft and engaged with the output.

The optional input gear may include a first optional gear concentrically positioned with the input shaft and engaged with the output, a second optional gear connected with the first optional gear, engaged with the output, and configured to have a different gear ratio than the first optional gear, a third optional gear concentrically positioned with the input shaft, engaged with the output, and configured to have a different gear ratio than the first optional gear and the second optional gear, and a fourth optional shift provided on the input shaft and optionally engaged with the second optional gear and the third optional gear.

The first transmission may include a first transmission shaft connected with the first motor generator and positioned parallel to the input shaft, and a first transmission gear provided on the first transmission shaft and engaged with the constant input gear.

The output may include an output shaft positioned between the input and the second transmission, a first output transmission gear concentrically positioned with the output shaft and connected with the first optional gear, a second output transmission gear concentrically positioned with the output shaft and connected with the second optional gear, a third output transmission gear provided on the output shaft and configured to connect the third optional gear and the second transmission, a fourth output shift provided on the output shaft and optionally engaged with the first output transmission gear and the second output transmission gear, and an output differential gear provided on the output shaft and connected with the differential.

The second transmission may include a second transmission shaft connected with the second motor generator and positioned parallel to the input shaft, and a second transmission gear provided on the second transmission shaft and engaged with the third output transmission gear.

The differential may include a differential gear configured to provide power to the wheels, and a differential connection provided on the differential gear and engaged with the output differential gear.

In the power transmission device for a hybrid vehicle according to the present disclosure, the input, connected to the engine, is constantly connected with the first motor generator to transmit rotational force and optionally connected with the output to transmit rotational force. The output may be constantly connected with the second motor generator to transmit rotational force and constantly connected with the differential to transmit rotational force. The input, the first transmission connected with the first motor generator, and the second transmission connected with the second motor generator are positioned parallel to each other, allowing for reduced the overall length.

DETAILED DESCRIPTION OF THE ILLUSTRATED EMBODIMENTS

Figure 1:
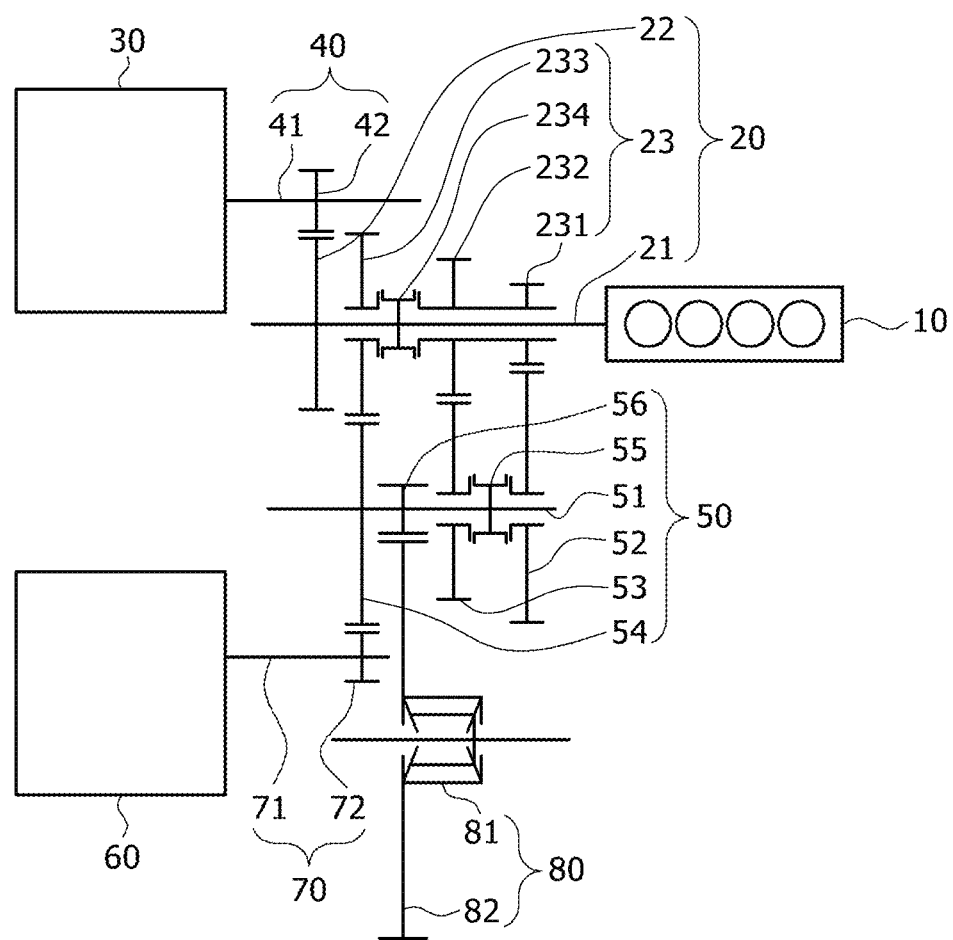
FIG. 1 is a schematic view showing a power transmission device for a hybrid vehicle according to an embodiment of the present disclosure.

Hereinafter, embodiments of a power transmission device for a hybrid vehicle according to the present disclosure will be described in detail with reference to the accompanying drawings. For clarity and convenience in description, thicknesses of lines, sizes of constituent elements, and the like may be illustrated in a non-exact proportion in the drawings. In addition, the terms used below are defined in consideration of the functions thereof in the present disclosure and may vary depending on the intention of a user or an operator or common practice. Therefore, these terms should be contextually defined in light of the present specification.

FIG. 1 is a schematic view showing a power transmission device for a hybrid vehicle according to an embodiment of the present disclosure. Referring to FIG. 1, a power transmission device 1 for a hybrid vehicle according to an embodiment of the present disclosure includes an engine 10, an input 20, a first motor generator 30, a first transmission 40, an output 50, a second motor generator 60, a second transmission 70, and a differential 80.

The engine 10 is a device that generates power by driving an internal combustion engine. The input 20 may be connected with the engine 10 and configured to provide three-speed power with different gear ratios. For example, the input 20 may have a shaft shape and be positioned between the first transmission 40 and the second transmission 70. Through the input 20, power for low-speed (1st gear), medium-speed (2nd gear), or high-speed (3rd gear) driving may be transmitted.

The first motor generator 30 is driven when power is applied, and the first transmission 40 may be connected to the first motor generator 30. The first transmission 40 may be positioned parallel to the input 20 and transmit power to the input 20. For example, the first motor generator 30 may rotate the first transmission 40 to start the engine 10 and provide driving power. When rotational force of the input 20 is provided to the first motor generator 30 through the first transmission 40, the first motor generator 30 may generate power.

The output 50 may be optionally engaged with the input 20. For example, the output 50 may be positioned between the input 20 and the second transmission 70. The input 20, the output 50, and the second transmission 70 may be positioned parallel.

The second motor generator 60 is driven when power is applied, and the second transmission 70 may be connected to the second motor generator 60. The second transmission 70 may transmit power to the output 50. For example, the second motor generator 60 may rotate the second transmission 70 to provide driving power. When rotational force of the output 50 is provided to the second motor generator 60 through the second transmission 70, the second motor generator 60 may generate power.

The differential 80 may be engaged with the output 50 to provide power to wheels. For example, the differential 80 may be a differential gear that divides and distributes driving force of the right and left wheels to allow for different rotation on the right and left sides.

The input 20 according to an embodiment of the present disclosure may include an input shaft 21, a constant input gear 22, and an optional input gear 23.

The input shaft 21 may be connected with the engine 10. For example, the input shaft 21 may be directly connected to the engine 10 and rotate about the shaft when the engine 10 is driven. The input shaft 21 may be positioned between the first transmission 40 and the output 50.

The constant input gear 22 may be constantly connected to the input shaft 21. The constant input gear 22 may be engaged with the first transmission 40. For example, the constant input gear 22 may be constantly connected with the first transmission 40 to transmit power.

The optional input gear 23 may be optionally connected to the input shaft 21 and be engaged with the output 50. For example, the optional input gear 23 may be automatically or manually connected to the input shaft 21 to transmit rotational force or may be spaced apart from the input shaft 21 to limit rotational force transmission.

The optional input gear 23 may be positioned closer to the engine 10 than the constant input gear 22.

The optional input gear 23 according to an embodiment of the present disclosure may include a first optional gear 231, a second optional gear 232, a third optional gear 233, and a fourth optional shift 234.

The first optional gear 231 may be concentrically positioned with the input shaft 21 and be engaged with the output 50. For example, the first optional gear 231 may be rotatably supported in a housing (not shown), and the input shaft 21 may be inserted through the first optional gear 231. The first optional gear 231 may be designed to have a gear ratio for low speed.

The second optional gear 232 may be connected with the first optional gear 231 and be engaged with the output 50. The second optional gear 232 may have a different gear ratio than the first optional gear 231. For example, the second optional gear 232 may be concentrically positioned with the input shaft 21, and the input shaft 21 may be inserted through the second optional gear 232. The second optional gear 232 may be rotatably supported in a housing (not shown). The second optional gear 232 may extend laterally from the first optional gear 231 and rotate integrally. The second optional gear 232 may be designed to have a gear ratio for medium speed.

The third optional gear 233 may be concentrically positioned with the input shaft 21 and be engaged with the output 50. The third optional gear 233 may have a different gear ratio than the first optional gear 231 and the second optional gear 232. For example, the third optional gear 233 may be rotatably supported in a housing (not shown), and the input shaft 21 may be inserted through the third optional gear 233. The third optional gear 233 may be designed to have a gear ratio for high speed.

The fourth optional shift 234 may be provided on the input shaft 21 and be optionally engaged with the second optional gear 232 and the third optional gear 233. For example, the fourth optional shift 234 may be constantly connected with the input shaft 21. The fourth optional shift 234 may be positioned between the second optional gear 232 and the third optional gear 233. The fourth optional shift 234 may be connected or disconnected with the second optional gear 232 in response to an operation signal. The fourth optional shift 234 may be connected or disconnected with the third optional gear 233 in response to an operation signal. When the fourth optional shift 234 is connected with the second optional gear 232, rotational force of the input shaft 21 may be transmitted to the second optional gear 232. When the fourth optional shift 234 is connected with the third optional gear 233, rotational force of the input shaft 21 may be transmitted to the third optional gear 233. When the fourth optional shift 234 is disconnected with the second optional gear 232, rotational force of the input shaft 21 may not be transmitted to the second optional gear 232. When the fourth optional shift 234 is disconnected with the third optional gear 233, rotational force of the input shaft 21 may not be transmitted to the third optional gear 233.

The first transmission 40 according to an embodiment of the present disclosure may include a first transmission shaft 41 and a first transmission gear 42.

The first transmission shaft 41 may be connected to the first motor generator 30 and positioned parallel to the input shaft 21. For example, the first transmission shaft 41 may be connected with or configured to extend from a rotational shaft provided in the first motor generator 30.

The first transmission gear 42 may be provided on the first transmission shaft 41 and configured to remain engaged with the constant input gear 22. For example, the first transmission gear 42 and the constant input gear 22 may remain in constant connection, such that rotational force may be transmitted.

The output 50 according to an embodiment of the present disclosure may include an output shaft 51, a first output transmission gear 52, a second output transmission gear 53, a third output transmission gear 54, a fourth output shift 55, and an output differential gear 56.

The output shaft 51 may be positioned between the input 20 and the second transmission 70. For example, the output shaft 51 may be rotatably supported in a housing (not shown), and the input shaft 21, the output shaft 51, and the second transmission 70 may be positioned parallel.

The first output transmission gear 52 may be concentrically positioned with the output shaft 51 and be connected with the first optional gear 231. For example, the first output transmission gear 52 may remain in constant connection with the first optional gear 231, which is responsible for low-speed driving. The first output transmission gear 52 may be rotatably supported in a housing (not shown), and the output shaft 51 may be inserted through the first output transmission gear 52.

The second output transmission gear 53 may be concentrically positioned with the output shaft 51 and be connected with the second optional gear 232. For example, the second output transmission gear 53 may remain in constant connection with the second optional gear 232, which is responsible for medium-speed driving. The second output transmission gear 53 may be rotatably supported in a housing (not shown), and the output shaft 51 may be inserted through the second output transmission gear 53.

The third output transmission gear 54 may be provided on the output shaft 51 and configured to connect the third optional gear 233 and the second transmission 70. For example, the third output transmission gear 54 may remain in constant connection with the third optional gear 233, which is responsible for high-speed driving. The third output transmission gear 54 may be connected with the output shaft 51.

The fourth output shift 55 may be provided on the output shaft 51 and be optionally engaged with the first output transmission gear 52 and the second output transmission gear 53. For example, the fourth output shift 55 may be constantly connected with the output shaft 51. The fourth output shift 55 may be positioned between the first output transmission gear 52 and the second output transmission gear 53. The fourth output shift 55 may be connected or disconnected with the first output transmission gear 52 in response to an operation signal. The fourth output shift 55 may be connected or disconnected with the second output transmission gear 53 in response to an operation signal. When the fourth output shift 55 is connected with the first output transmission gear 52, rotational force of the first optional gear 231 may be transmitted to the output shaft 51 through the first output transmission gear 52. When the fourth output shift 55 is connected with the second output transmission gear 53, rotational force of the second optional gear 232 may be transmitted to the output shaft 51 through the second output transmission gear 53.

The output differential gear 56 may be provided on the output shaft 51 and be connected with the differential 80. For example, the output differential gear 56 may be positioned between the second output transmission gear 53 and the third output transmission gear 54.

The second transmission 70 according to an embodiment of the present disclosure may include a second transmission shaft 71 and a second transmission gear 72.

The second transmission shaft 71 may be connected to the second motor generator 60 and positioned parallel to the input shaft 21. For example, the second transmission shaft 71 may be connected with or configured to extend from a rotational shaft provided in the second motor generator 60.

The second transmission gear 72 may be provided on the second transmission shaft 71 and engaged with the third output transmission gear 54. For example, the second transmission gear 72 may be constantly connected with the third output transmission gear 54 to transmit power.

The differential 80 according to an embodiment of the present disclosure may include a differential gear 81 and a differential connection 82.

The differential gear 81 may provide power to the wheels. For example, the differential gear 81 may be a differential gear that distributes power to the right and left wheels.

The differential connection 82 may be provided on the differential gear 81 and engaged with the output differential gear 56. For example, the differential connection 82 may be rotatably mounted in a housing (not shown) and remain in constant connection with the output differential gear 56. The differential connection 82 may transmit rotational force of the output differential gear 56 to the differential gear 81.

Figure 2:
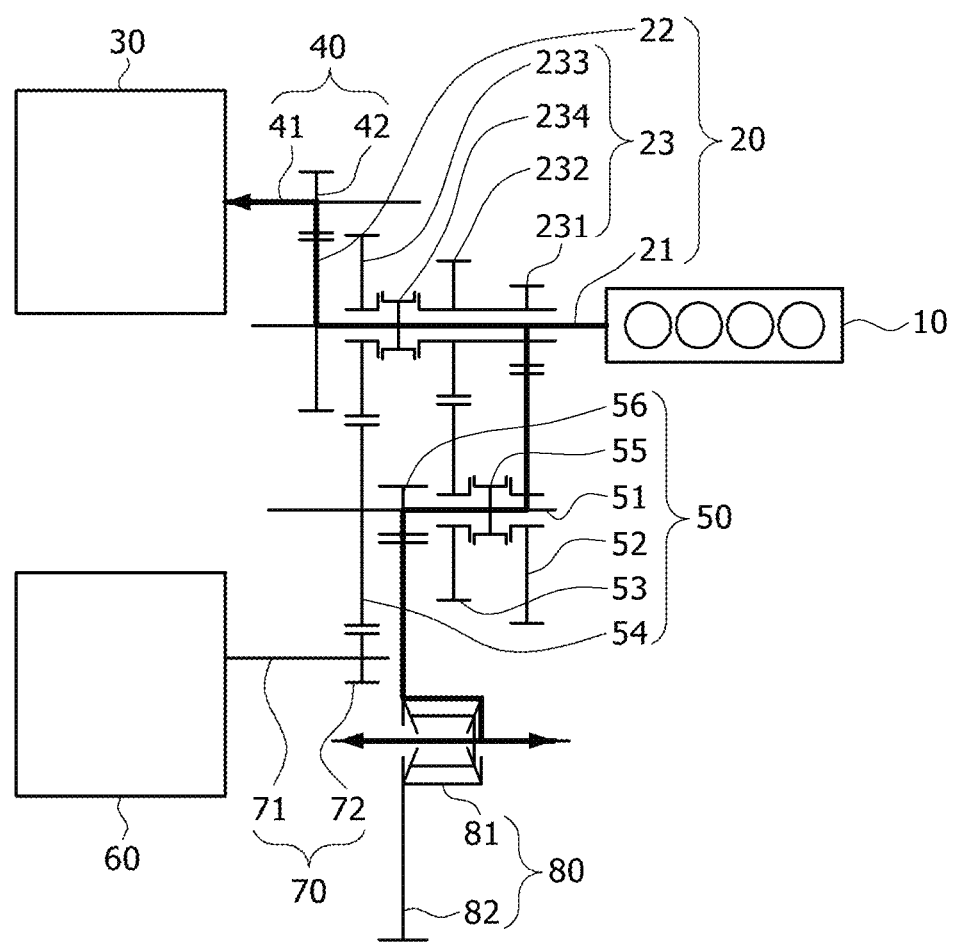
FIG. 2 is a schematic view showing a first-gear drive and a power generation mode of a first motor generator, executed by an engine in FIG. 1.

FIG. 2 is a schematic view showing a first-gear drive and a power generation mode of the first motor generator, executed by the engine in FIG. 1. Referring to FIG. 2, when the engine 10 is driven, the fourth optional shift 234 is connected with the second optional gear 232, and the fourth output shift 55 is connected with the first output transmission gear 52. When the engine 10 is driven, rotational force of the input shaft 21 is transmitted to the first output transmission gear 52 through the optional input gear 23 to rotate the output shaft 51. When the output shaft 51 rotates, the differential 80, connected with the output differential gear 56, rotates to provide the first-gear driving force to the wheels. When the input shaft 21 rotates, the first transmission 40 may rotate through the constant input gear 22, such that the first motor power generator 30 may generate power.

Figure 3:
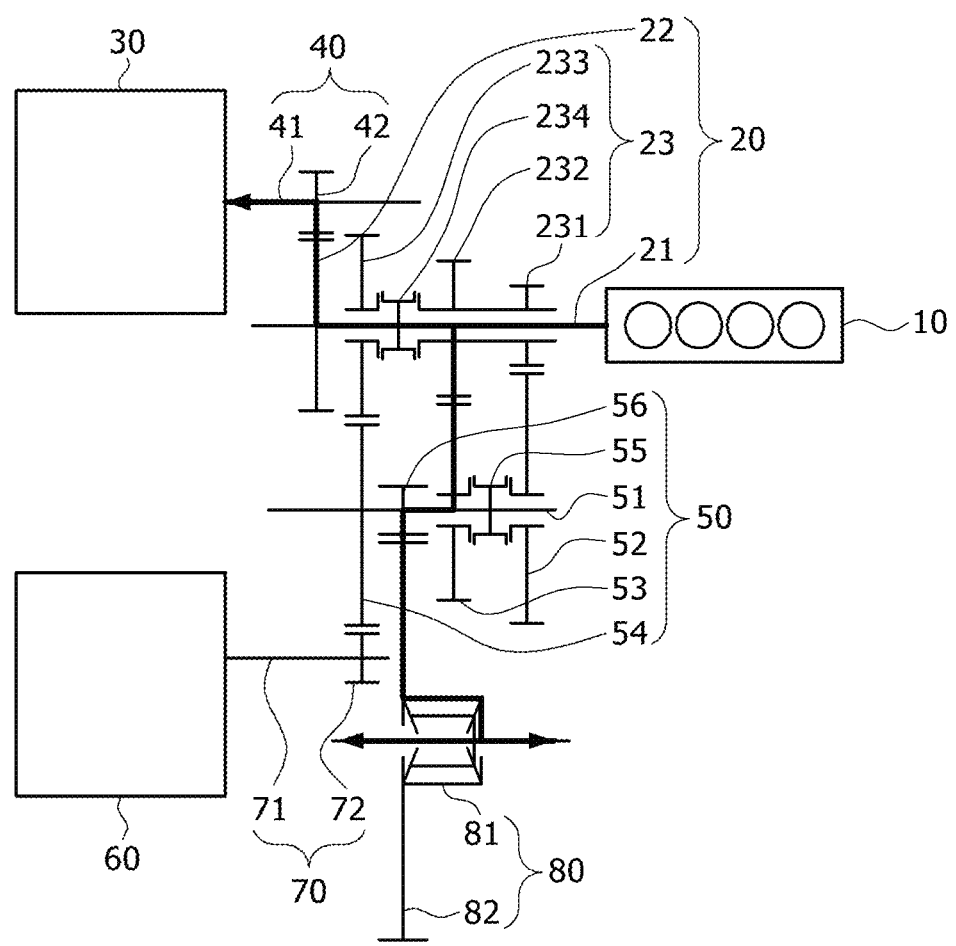
FIG. 3 is a schematic view showing a second-gear drive and the power generation mode of the first motor generator, executed by the engine in FIG. 1.

FIG. 3 is a schematic view showing a second-gear drive and the power generation mode of the first motor generator, executed by the engine in FIG. 1. Referring to FIG. 3, when the engine 10 is driven, the fourth optional shift 234 is connected with the second optional gear 232, and the fourth output shift 55 is connected with the second output transmission gear 53. When the engine 10 is driven, rotational force of the input shaft 21 is transmitted to the second output transmission gear 53 through the optional input gear 23 to rotate the output shaft 51. When the output shaft 51 rotates, the differential 80, connected with the output differential gear 56, rotates to provide the second-gear driving force to the wheels. When the input shaft 21 rotates, the first transmission 40 may rotate through the constant input gear 22, such that the first motor power generator 30 may generate power.

Figure 4:
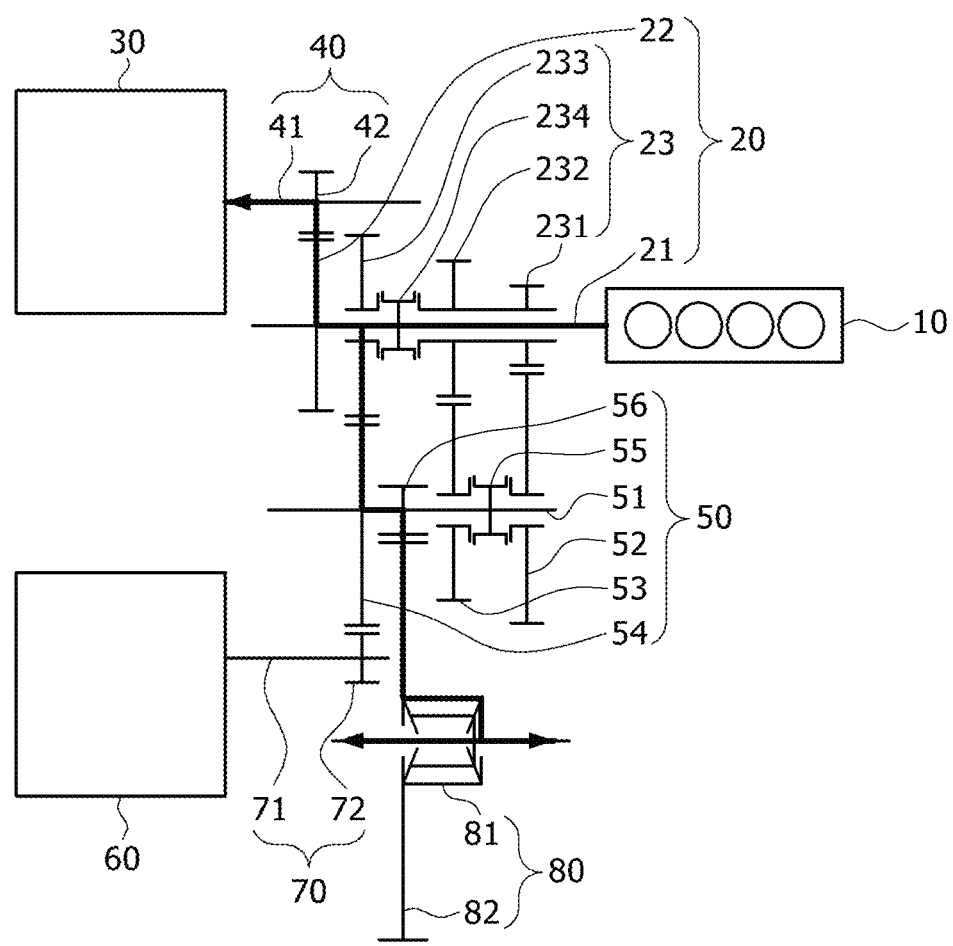
FIG. 4 is a schematic view showing a third-gear drive and the power generation mode of the first motor generator, executed by the engine in FIG. 1.

FIG. 4 is a schematic view showing a third-gear drive and the power generation mode of the first motor generator, executed by the engine in FIG. 1. Referring to FIG. 4, when the engine 10 is driven, the fourth optional shift 234 is connected with the third optional gear 233. In this case, the fourth output shift 55 may not be connected with the first output transmission gear 52 and the second output transmission gear 53. When the engine 10 is driven, rotational force of the input shaft 21 is transmitted to the third output transmission gear 54 through the optional input gear 23 to rotate the output shaft 51. When the output shaft 51 rotates, the differential 80, connected with the output differential gear 56, rotates to provide the third-gear driving force to the wheels. When the input shaft 21 rotates, the first transmission 40 may rotate through the constant input gear 22, such that the first motor power generator 30 may generate power.

Figure 5:
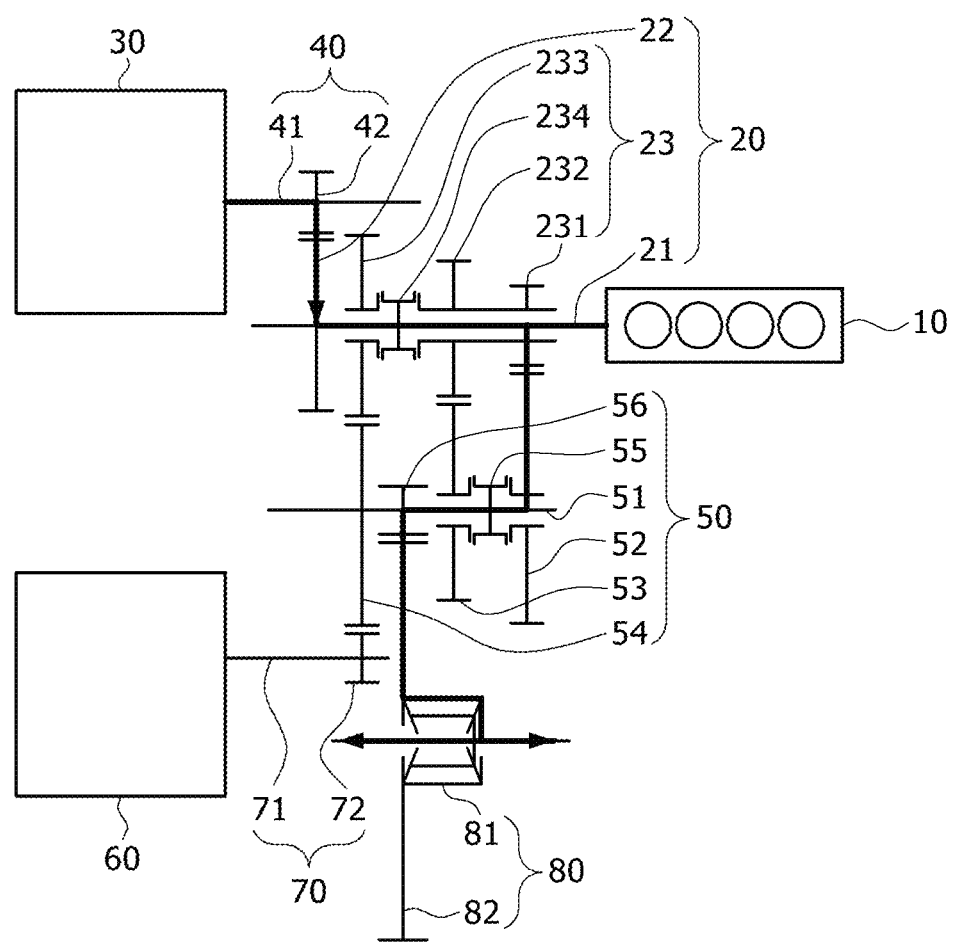
FIG. 5 is a schematic view showing a first-gear drive mode executed by the engine and the first motor generator in FIG. 1.

FIG. 5 is a schematic view showing a first-gear drive mode executed by the engine and the first motor generator in FIG. 1. Referring to FIG. 5, when the engine 10 and the first motor generator 30 are driven, the fourth optional shift 234 is connected with the second optional gear 232, and the fourth output shift 55 is connected with the first output transmission gear 52. The driving force of the engine 10 rotates the input shaft 21. In addition, when the first transmission 40 is rotated by driving the first motor generator 30, the rotational force of the first transmission 40 is transmitted to the input shaft 21. The rotational force of the input shaft 21 is transmitted to the first output transmission gear 52 through the optional input gear 23 to rotate the output shaft 51. When the output shaft 51 rotates, the differential 80, connected with the output differential gear 56, rotates to provide the first-gear driving force to the wheels.

Figure 6:
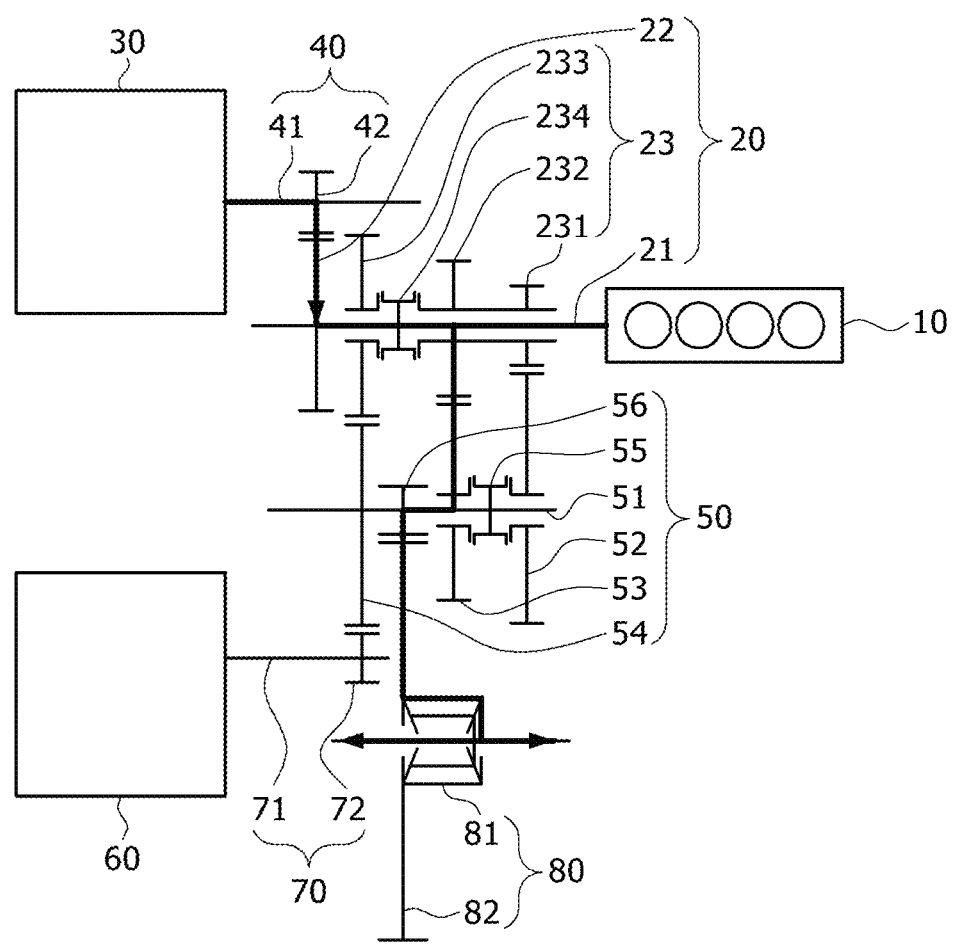
FIG. 6 is a schematic view showing a second-gear drive mode executed by the engine and the first motor generator in FIG. 1.

FIG. 6 is a schematic view showing a second-gear drive mode executed by the engine and the first motor generator in FIG. 1. Referring to FIG. 6, when the engine 10 and the first motor generator 30 are driven, the fourth optional shift 234 is connected with the second optional gear 232, and the fourth output shift 55 is connected with the second output transmission gear 53. The driving force of the engine 10 rotates the input shaft 21. In addition, when the first transmission 40 is rotated by driving the first motor generator 30, the rotational force of the first transmission 40 is transmitted to the input shaft 21. The rotational force of the input shaft 21 is transmitted to the second output transmission gear 53 through the optional input gear 23 to rotate the output shaft 51. When the output shaft 51 rotates, the differential 80, connected with the output differential gear 56, rotates to provide the second-gear driving force to the wheels.

Figure 7:
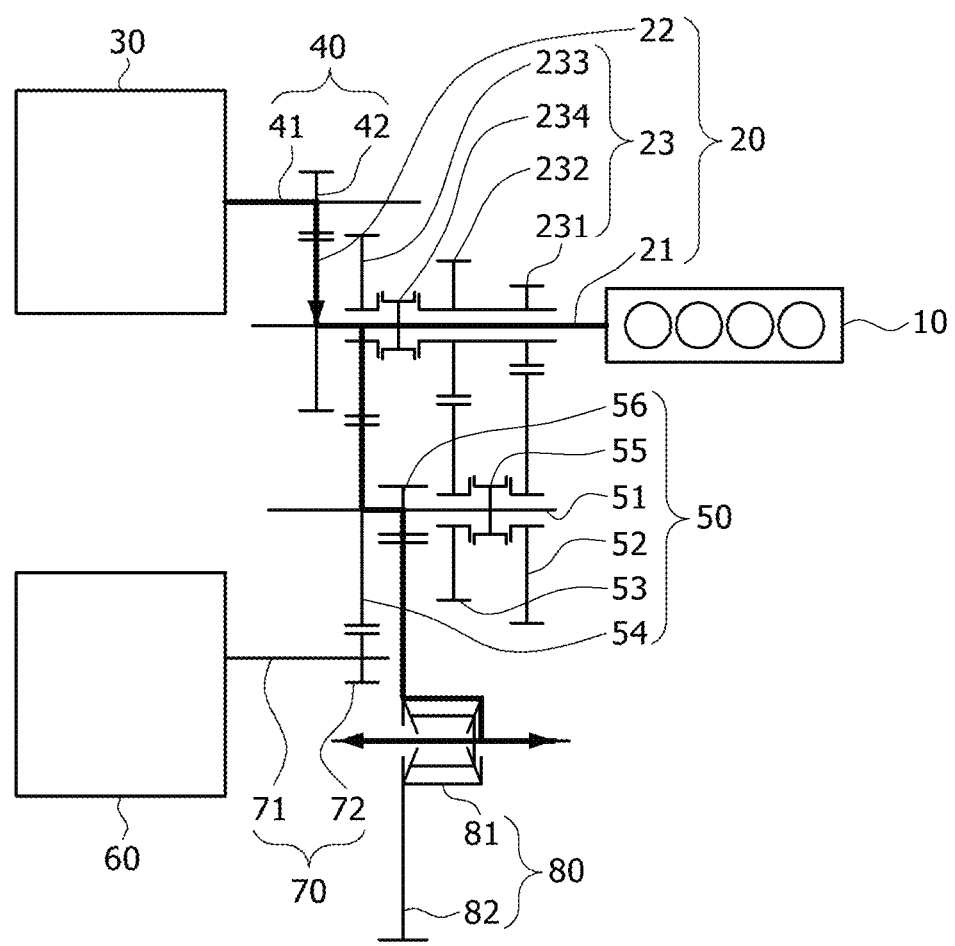
FIG. 7 is a schematic view showing a third-gear drive mode executed by the engine and the first motor generator in FIG. 1.

FIG. 7 is a schematic view showing a third-gear drive mode executed by the engine and the first motor generator in FIG. 1. Referring to FIG. 7, when the engine 10 and the first motor generator 30 are driven, the fourth optional shift 234 is connected with the third optional gear 233. In this case, the fourth output shift 55 may not be connected with the first output transmission gear 52 and the second output transmission gear 53. The driving force of the engine 10 rotates the input shaft 21. In addition, when the first transmission 40 is rotated by driving the first motor generator 30, the rotational force of the first transmission 40 is transmitted to the input shaft 21. The rotational force of the input shaft 21 is transmitted to the third output transmission gear 54 through the optional input gear 23 to rotate the output shaft 51. When the output shaft 51 rotates, the differential 80, connected with the output differential gear 56, rotates to provide the third-gear driving force to the wheels.

Figure 8:
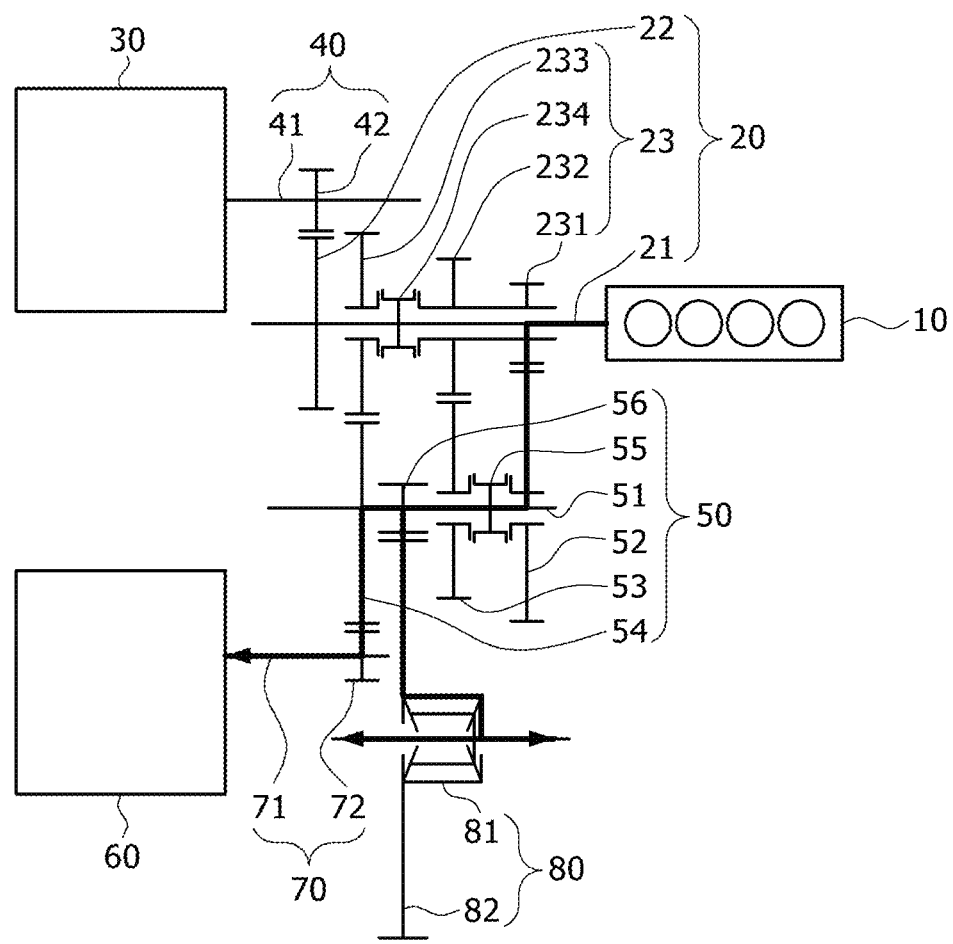
FIG. 8 is a schematic view showing the first-gear drive and a power generation mode of a second motor generator, executed by the engine in FIG. 1.

FIG. 8 is a schematic view showing the first-gear drive and a power generation mode of the second motor generator, executed by the engine in FIG. 1. Referring to FIG. 8, when the engine 10 is driven, the fourth optional shift 234 is connected with the second optional gear 232, and the fourth output shift 55 is connected with the first output transmission gear 52. When the engine 10 is driven, rotational force of the input shaft 21 is transmitted to the first output transmission gear 52 through the optional input gear 23 to rotate the output shaft 51. When the output shaft 51 rotates, the differential 80, connected with the output differential gear 56, rotates to provide the first-gear driving force to the wheels. When the output shaft 51 rotates, the second transmission 70 may rotate through the third output transmission gear 54, such that the second motor generator 60 may generate power.

Figure 9:
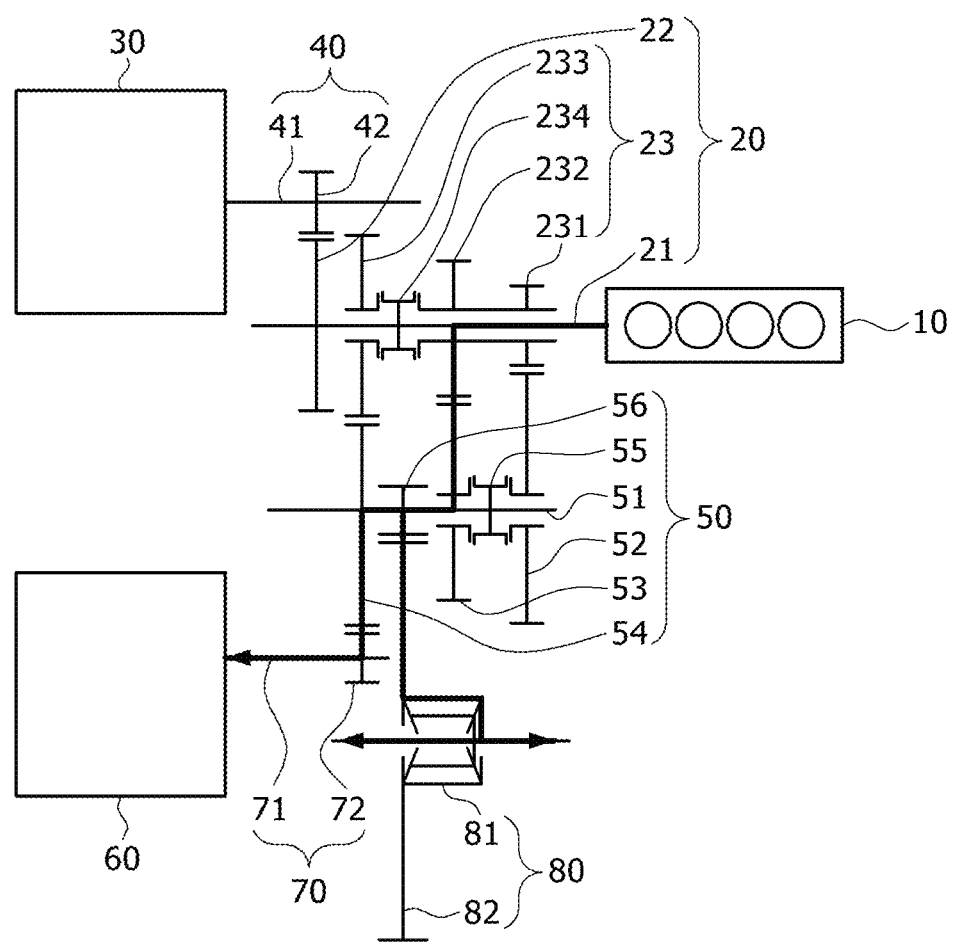
FIG. 9 is a schematic view showing the second-gear drive and the power generation mode of the second motor generator, executed by the engine in FIG. 1.

FIG. 9 is a schematic view showing the second-gear drive and the power generation mode of the second motor generator, executed by the engine in FIG. 1. Referring to FIG. 9, when the engine 10 is driven, the fourth optional shift 234 is connected with the second optional gear 232, and the fourth output shift 55 is connected with the second output transmission gear 53. When the engine 10 is driven, rotational force of the input shaft 21 is transmitted to the second output transmission gear 53 through the optional input gear 23 to rotate the output shaft 51. When the output shaft 51 rotates, the differential 80, connected with the output differential gear 56, rotates to provide the second-gear driving force to the wheels. When the output shaft 51 rotates, the second transmission 70 may rotate through the first output transmission gear 52, such that the second motor generator 60 may generate power.

Figure 10:
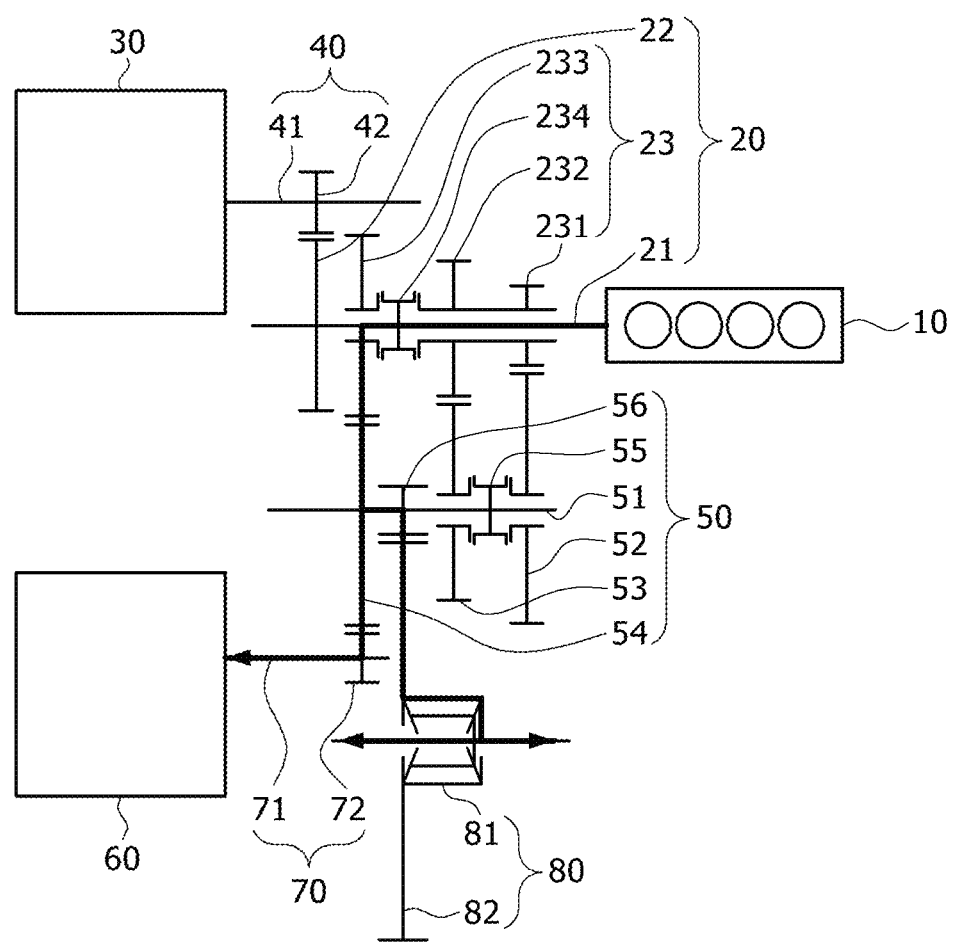
FIG. 10 is a schematic view showing the third-gear drive and the power generation mode of the second motor generator, executed by the engine in FIG. 1.

FIG. 10 is a schematic view showing the third-gear drive and the power generation mode of the second motor generator, executed by the engine in FIG. 1. Referring to FIG. 10, when the engine 10 is driven, the fourth optional shift 234 is connected with the third optional gear 233. In this case, the fourth output shift 55 may not be connected with the first output transmission gear 52 and the second output transmission gear 53. When the engine 10 is driven, rotational force of the input shaft 21 is transmitted to the third output transmission gear 54 through the optional input gear 23 to rotate the output shaft 51. When the output shaft 51 rotates, the differential 80, connected with the output differential gear 56, rotates to provide the third-gear driving force to the wheels. When the output shaft 51 rotates, the second transmission 70 may rotate through the first output transmission gear 52, such that the second motor generator 60 may generate power.

Figure 11:
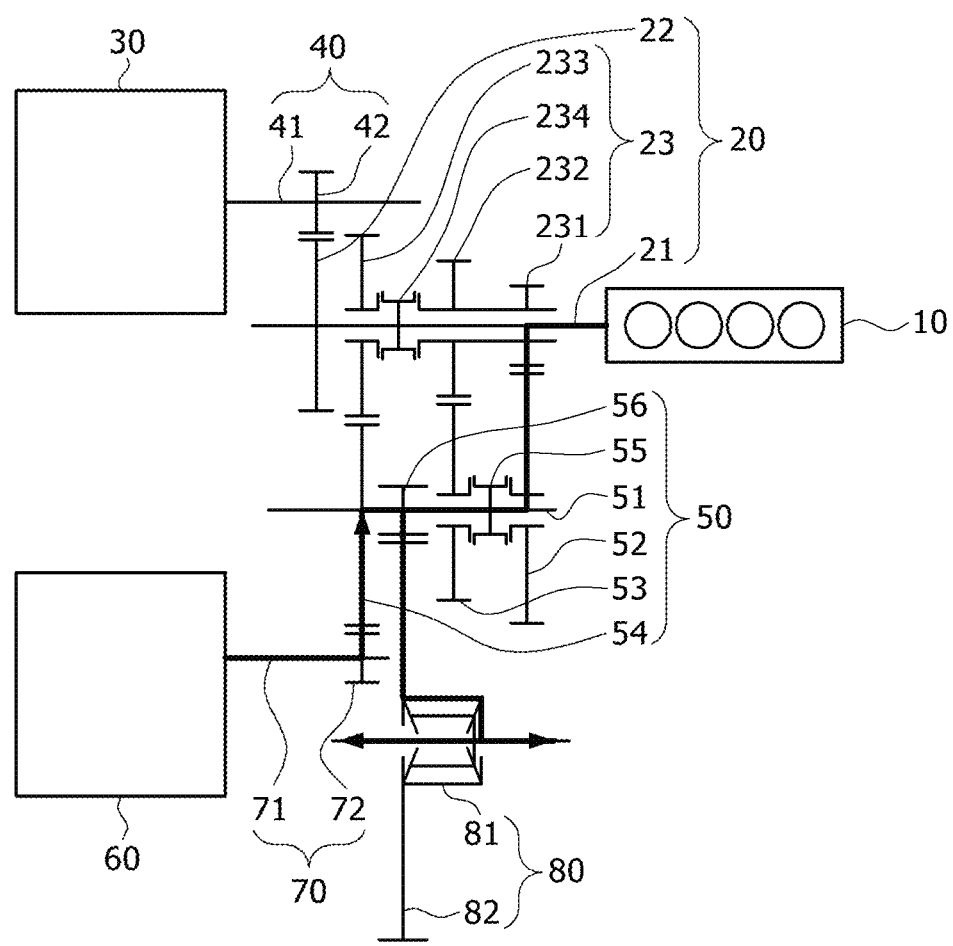
FIG. 11 is a schematic view showing the first-gear drive mode executed by the engine and the second motor generator in FIG. 1.

FIG. 11 is a schematic view showing the first-gear drive mode executed by the engine and the second motor generator in FIG. 1. Referring to FIG. 11, when the engine 10 and the second motor generator 60 are driven, the fourth optional shift 234 is connected with the second optional gear 232, and the fourth output shift 55 is connected with the first output transmission gear 52. The driving force of the engine 10 rotates the input shaft 21. When the input shaft 21 rotates, rotational force of the optional input gear 23 is transmitted to the output shaft 51 through the first output transmission gear 52. In addition, when the second transmission 70 is rotated by driving the second motor generator 60, the rotational force of the second transmission shaft 71 is transmitted to the output shaft 51 through the second transmission gear 72. The rotational force of the output shaft 51 is transmitted to the differential 80 through the output differential gear 56 to provide the first-gear driving force to the wheels.

Figure 12:
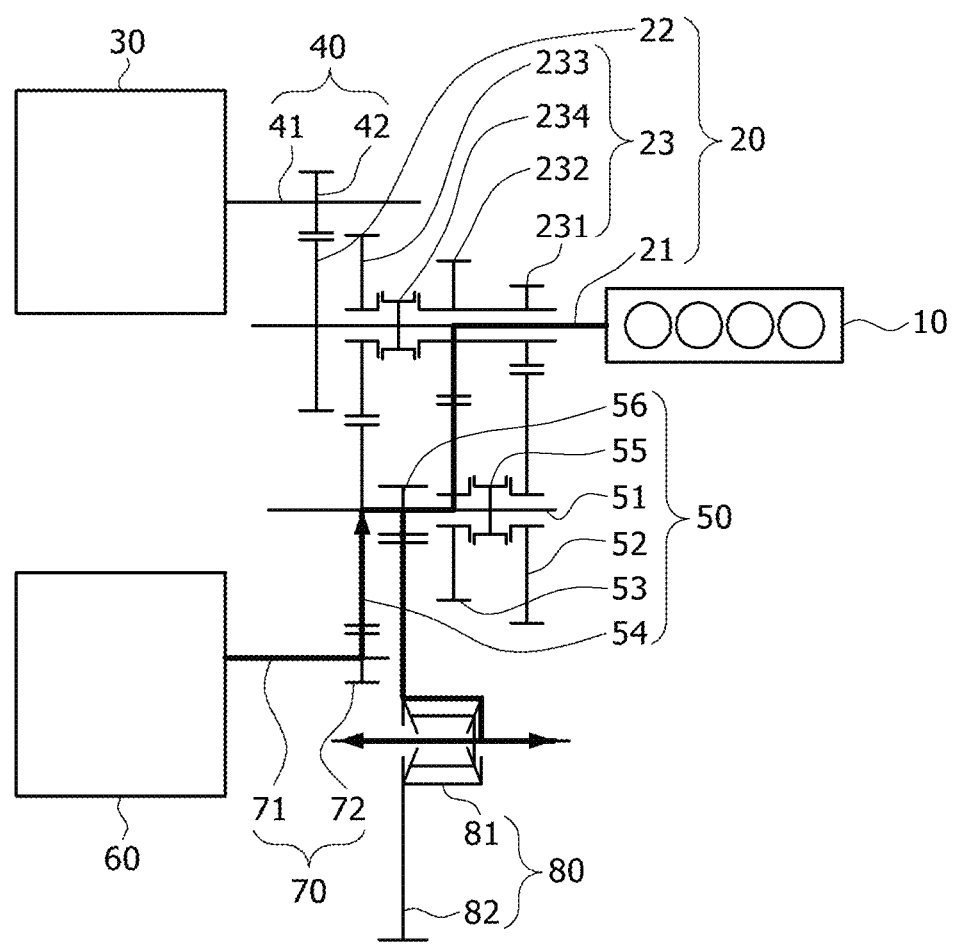
FIG. 12 is a schematic view showing the second-gear drive mode executed by the engine and the second motor generator in FIG. 1.

FIG. 12 is a schematic view showing the second-gear drive mode executed by the engine and the second motor generator in FIG. 1. Referring to FIG. 12, when the engine 10 and the second motor generator 60 are driven, the fourth optional shift 234 is connected with the second optional gear 232, and the fourth output shift 55 is connected with the second output transmission gear 53. The driving force of the engine 10 rotates the input shaft 21. When the input shaft 21 rotates, rotational force of the optional input gear 23 is transmitted to the output shaft 51 through the second output transmission gear 53. In addition, when the second transmission 70 is rotated by driving the second motor generator 60, the rotational force of the second transmission shaft 71 is transmitted to the output shaft 51 through the second transmission gear 72. The rotational force of the output shaft 51 is transmitted to the differential 80 through the output differential gear 56 to provide the second-gear driving force to the wheels.

Figure 13:
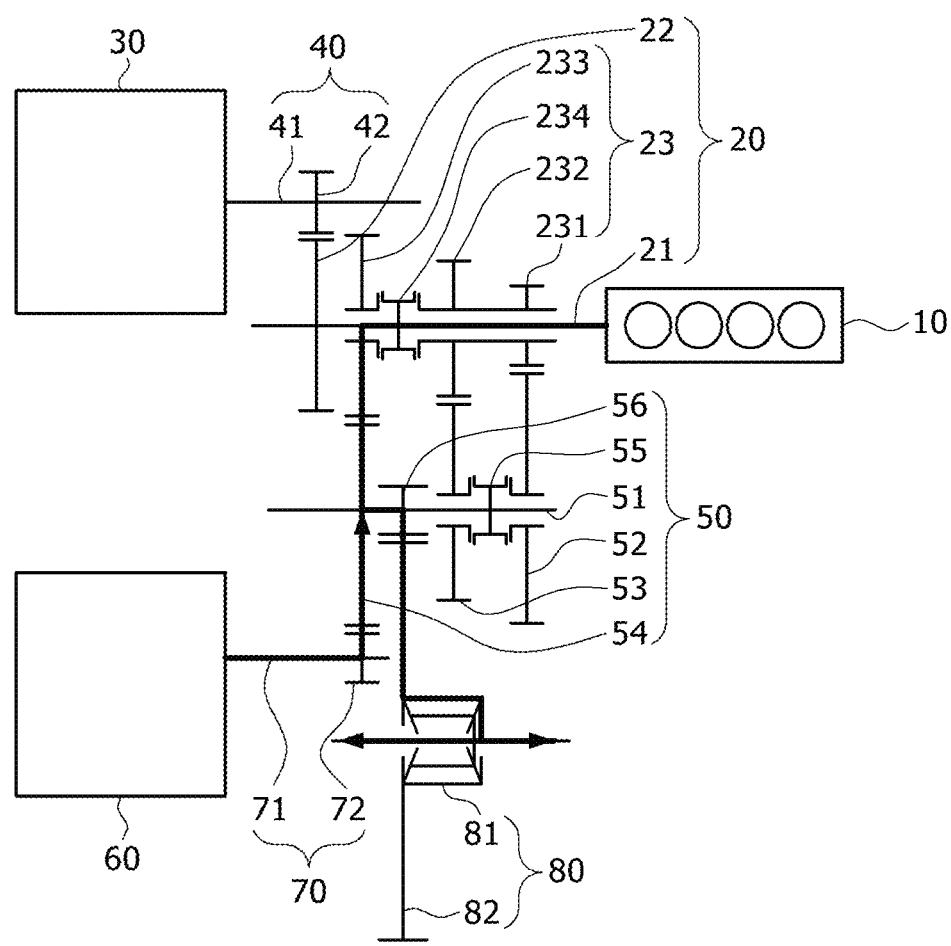
FIG. 13 is a schematic view showing the third-gear drive mode executed by the engine and the second motor generator in FIG. 1.

FIG. 13 is a schematic view showing the third-gear drive mode executed by the engine and the second motor generator in FIG. 1. Referring to FIG. 13, when the engine 10 and the second motor generator 60 are driven, the fourth optional shift 234 is connected with the third optional gear 233. In this case, the fourth output shift 55 may not be connected with the first output transmission gear 52 and the second output transmission gear 53. The driving force of the engine 10 rotates the input shaft 21. When the input shaft 21 rotates, rotational force of the optional input gear 23 is transmitted to the output shaft 51 through the third output transmission gear 54. In addition, when the second transmission 70 is rotated by driving the second motor generator 60, the rotational force of the second transmission shaft 71 is transmitted to the output shaft 51 through the second transmission gear 72. The rotational force of the output shaft 51 is transmitted to the differential 80 through the output differential gear 56 to provide the third-gear driving force to the wheels.

Figure 14:
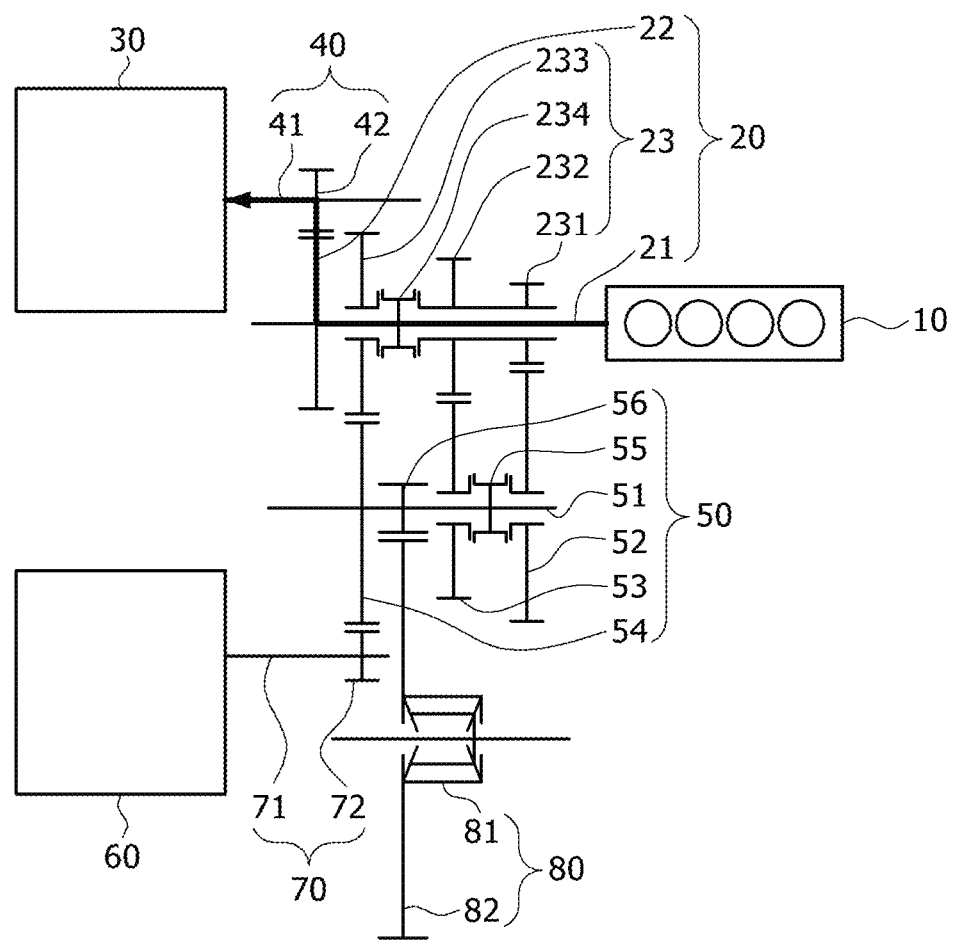
FIG. 14 is a schematic view showing the power generation mode of the first motor generator in FIG. 1.

FIG. 14 is a schematic view showing the power generation mode of the first motor generator in FIG. 1. Referring to FIG. 14, when the engine 10 is driven, the fourth optional shift 234 is disconnected with the second optional gear 232 and the third optional gear 233. When the engine 10 is driven, rotational force of the input shaft 21 may be transmitted to the first transmission 40 through the constant input gear 22, such that the first motor generator 30 may generate power.

Figure 15:
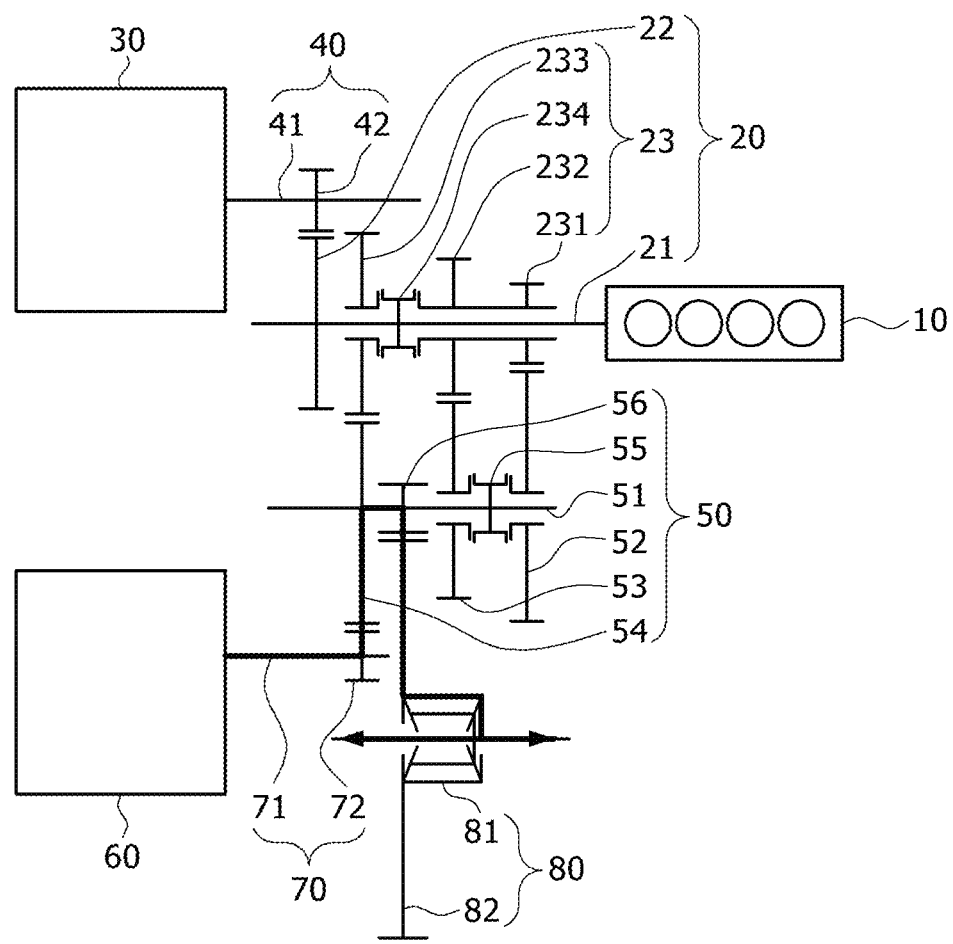
FIG. 15 is a schematic view showing the drive mode executed by the second motor generator in FIG. 1.

FIG. 15 is a schematic view showing the drive mode executed by the second motor generator in FIG. 1. Referring to FIG. 15, when the engine 10 is stopped and the second motor generator 60 is driven, rotational force of the second transmission shaft 71 is transmitted to the output shaft 51 through the second transmission gear 72. The rotational force of the output shaft 51 is transmitted to the differential 80 through the output differential gear 56 to provide driving force to the wheels.

Figure 16:
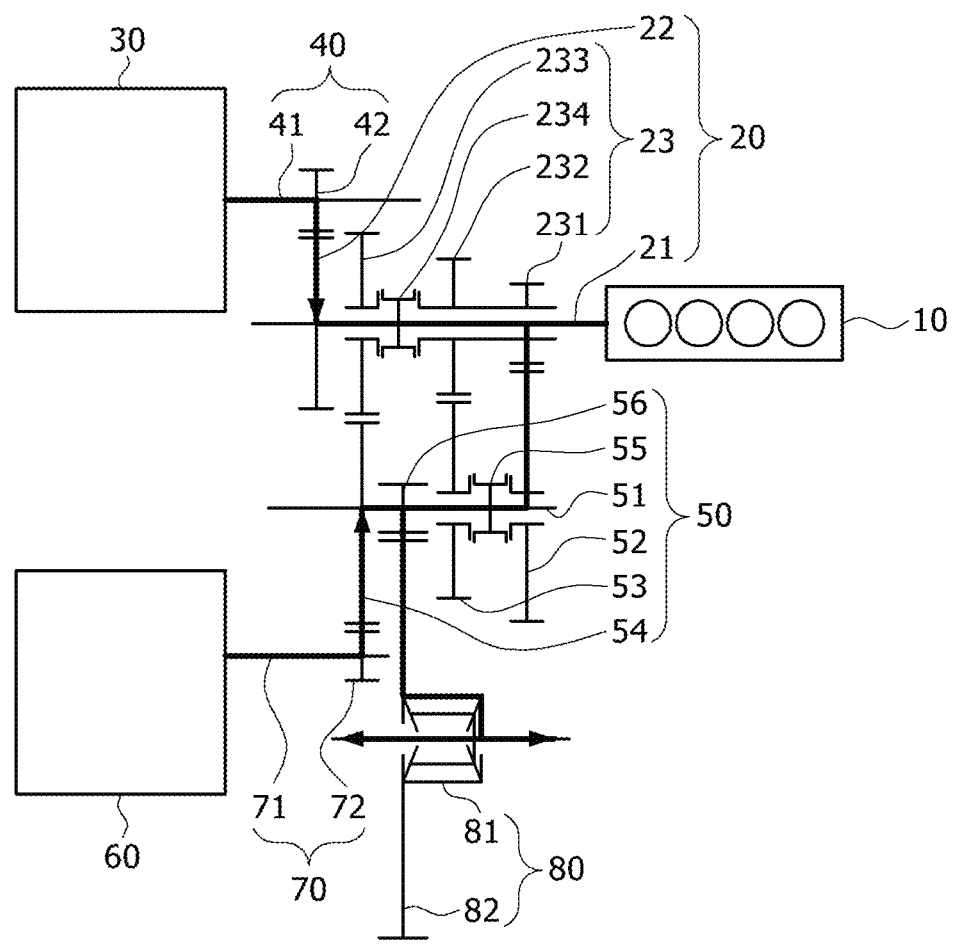
FIG. 16 is a schematic view showing the first-gear drive mode executed by the engine, the first motor generator, and the second motor generator in FIG. 1.

FIG. 16 is a schematic view showing the first-gear drive mode executed by the engine, the first motor generator, and the second motor generator in FIG. 1. Referring to FIG. 16, when the engine 10, the first motor generator 30, and the second motor generator 60 are driven, the fourth optional shift 234 is connected with the second optional gear 232, and the fourth output shift 55 is connected with the first output transmission gear 52. The driving force of the engine 10 rotates the input shaft 21. In addition, when the first transmission 40 is rotated by driving the first motor generator 30, the rotational force of the first transmission 40 is transmitted to the input shaft 21. The rotational force of the input shaft 21 is transmitted to the first output transmission gear 52 through the optional input gear 23 to rotate the output shaft 51. When the second transmission 70 is rotated by driving the second motor generator 60, the rotational force of the second transmission shaft 71 is transmitted to the output shaft 51 through the second transmission gear 72. The rotational force of the output shaft 51 is transmitted to the differential 80 through the output differential gear 56 to provide the first-gear driving force to the wheels.

Figure 17:
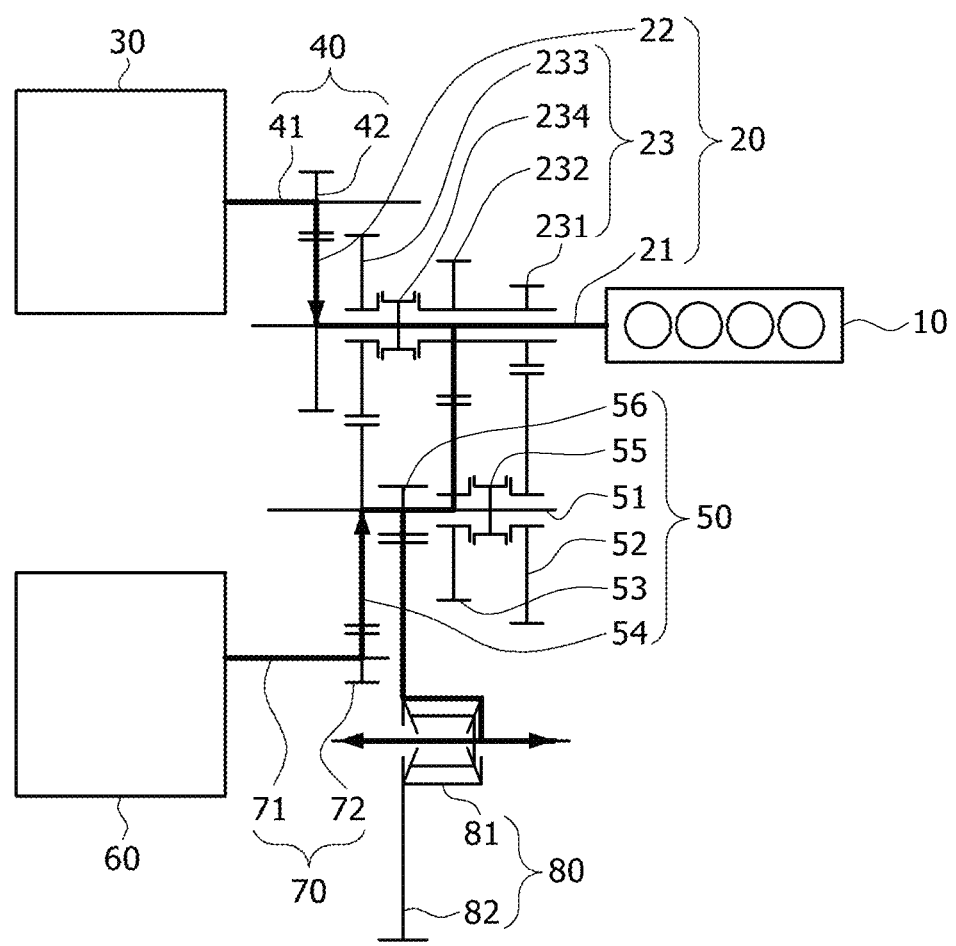
FIG. 17 is a schematic view showing the second-gear drive mode executed by the engine, the first motor generator, and the second motor generator in FIG. 1.

FIG. 17 is a schematic view showing the second-gear drive mode executed by the engine, the first motor generator, and the second motor generator in FIG. 1. Referring to FIG. 17, when the engine 10, the first motor generator 30, and the second motor generator 60 are driven, the fourth optional shift 234 is connected with the second optional gear 232, and the fourth output shift 55 is connected with the second output transmission gear 53. The driving force of the engine 10 rotates the input shaft 21. In addition, when the first transmission 40 is rotated by driving the first motor generator 30, the rotational force of the first transmission 40 is transmitted to the input shaft 21. The rotational force of the input shaft 21 is transmitted to the second output transmission gear 53 through the optional input gear 23 to rotate the output shaft 51. When the second transmission 70 is rotated by driving the second motor generator 60, the rotational force of the second transmission shaft 71 is transmitted to the output shaft 51 through the second transmission gear 72. The rotational force of the output shaft 51 is transmitted to the differential 80 through the output differential gear 56 to provide the second-gear driving force to the wheels.

Figure 18:
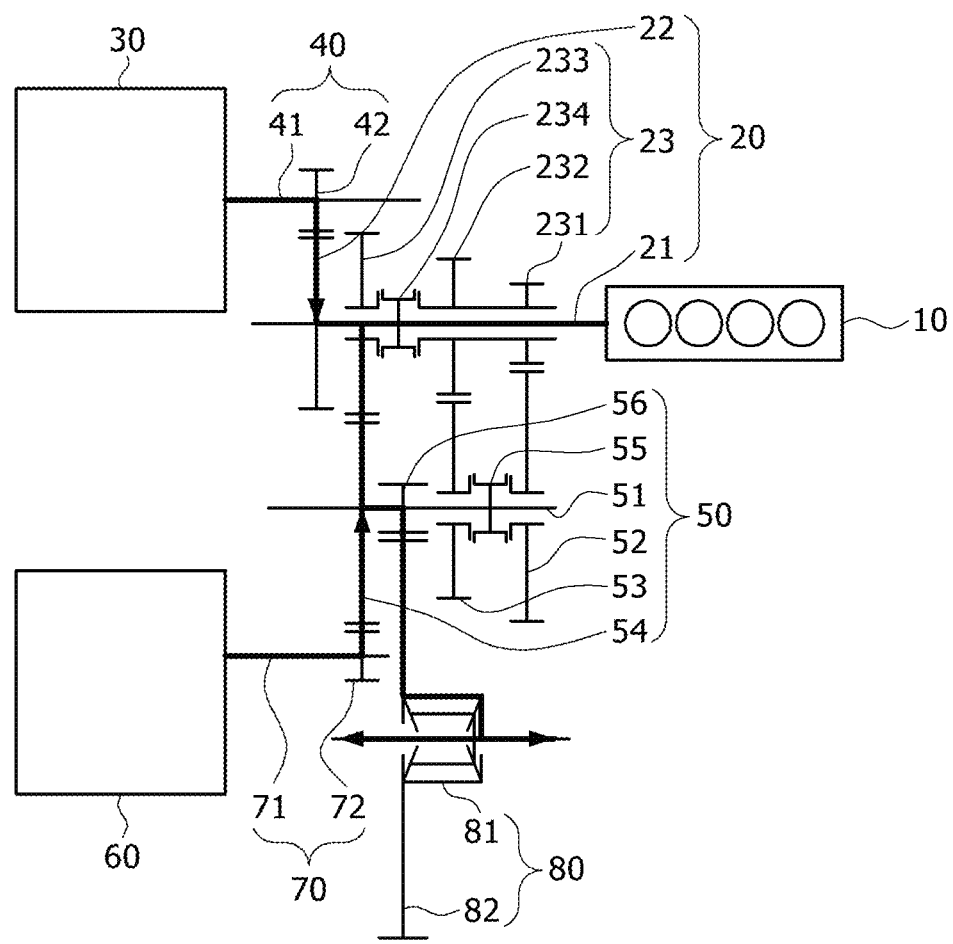
FIG. 18 is a schematic view showing the third-gear drive mode executed by the engine, the first motor generator, and the second motor generator in FIG. 1.

FIG. 18 is a schematic view showing the third-gear drive mode executed by the engine, the first motor generator, and the second motor generator in FIG. 1. Referring to FIG. 18, when the engine 10, the first motor generator 30, and the second motor generator 60 are driven, the fourth optional shift 234 is connected with the third optional gear 233. In this case, the fourth output shift 55 may not be connected with the first output transmission gear 52 and the second output transmission gear 53. The driving force of the engine 10 rotates the input shaft 21. In addition, when the first transmission 40 is rotated by driving the first motor generator 30, the rotational force of the first transmission 40 is transmitted to the input shaft 21. The rotational force of the input shaft 21 is transmitted to the third output transmission gear 54 through the optional input gear 23 to rotate the output shaft 51. When the second transmission 70 is rotated by driving the second motor generator 60, the rotational force of the second transmission shaft 71 is transmitted to the output shaft 51 through the second transmission gear 72. The rotational force of the output shaft 51 is transmitted to the differential 80 through the output differential gear 56 to provide the third-gear driving force to the wheels.

In the power transmission device 1 for a hybrid vehicle according to an embodiment of the present disclosure, the input 20, connected to the engine 10, is constantly connected with the first motor generator 30 to transmit rotational force and optionally connected with the output 50 to transmit rotational force. The output 50 may be constantly connected with the second motor generator 60 to transmit rotational force and constantly connected with the differential 80 to transmit rotational force. The input 20, the first transmission 40 connected with the first motor generator 30, and the second transmission 70 connected with the second motor generator 60 are positioned parallel to each other, allowing for reduced an overall length.

The present disclosure has been described with reference to the embodiments illustrated in the drawings. Although the embodiments have been disclosed for illustrative purposes, those skilled in the art will appreciate that various modifications and equivalent embodiments are possible. Thus, the true technical scope of the disclosure should be defined by the following claims.

What is claimed is:

1. A power transmission device for a hybrid vehicle comprising:
    an engine configured to generate power;
    an input connected with the engine and configured to provide power with different gear ratios;
    a first motor generator driven when power is applied;
    a first transmission connected with the first motor generator, positioned parallel to the input, and configured to transmit power to the input;
    an output engaged with the input;
    a second motor generator driven when power is applied;
    a second transmission connected with the second motor generator, positioned parallel to the output, and configured to transmit power to the output; and
    a differential engaged with the output and configured to provide power to wheels,
    wherein the input comprises:
        an input shaft connected with the engine;
        a constant input gear constantly connected with the input shaft and engaged with the first transmission; and
        at least one optional input gear connected with the input shaft and engaged with the output,
    wherein the at least one optional input gear comprises:
        a first optional gear concentrically positioned with the input shaft and engaged with the output;
        a second optional gear connected with the first optional gear, engaged with the output, and configured to have a different gear ratio than the first optional gear;
        a third optional gear concentrically positioned with the input shaft, engaged with the output, and configured to have a different gear ratio than the first optional gear and the second optional gear; and
        a fourth optional shift provided on the input shaft and engaged with the second optional gear and the third optional gear, and
    wherein the output comprises:
        an output shaft positioned between the input and the second transmission;
        a first output transmission gear concentrically positioned with the output shaft and connected with the first optional gear;
        a second output transmission gear concentrically positioned with the output shaft and connected with the second optional gear;
        a third output transmission gear provided on the output shaft and configured to connect the third optional gear and the second transmission;
        a fourth output shift provided on the output shaft and engaged with the first output transmission gear and the second output transmission gear; and
        an output differential gear provided on the output shaft and connected with the differential.

2. The device of claim 1, wherein the second transmission comprises:
    a second transmission shaft connected with the second motor generator and positioned parallel to the input shaft; and
    a second transmission gear provided on the second transmission shaft and engaged with the third output transmission gear.

3. The device of claim 1, wherein the differential comprises:
    a differential gear configured to provide power to the wheels; and
    a differential connection provided on the differential gear and engaged with the output differential gear.

* * * * *